United States Patent
Uchimura

(12) 
(10) Patent No.: US 8,641,589 B2
(45) Date of Patent: Feb. 4, 2014

(54) PRECISION ROLL TURNING LATHE AND AUTOMATIC TOOL CHANGER THEREFOR

(75) Inventor: Hiroshi Uchimura, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 206 days.

(21) Appl. No.: 13/108,088

(22) Filed: May 16, 2011

(65) Prior Publication Data

US 2011/0277603 A1    Nov. 17, 2011

(30) Foreign Application Priority Data

May 17, 2010    (JP) ................................ 2010-112952

(51) Int. Cl.
*B23D 13/00*    (2006.01)
(52) U.S. Cl.
USPC .............................. 483/22; 409/304; 409/345
(58) Field of Classification Search
USPC ........... 483/17, 22, 24, 25, 26, 58, 59, 60, 61, 483/62, 12, 10, 11; 409/302, 304, 307, 317, 409/326, 327, 345, 346
See application file for complete search history.

(56) References Cited

U.S. PATENT DOCUMENTS

| | | | | | |
|---|---|---|---|---|---|
| 3,103,839 | A | * | 9/1963 | Mancuso | 82/158 |
| 3,107,562 | A | * | 10/1963 | Miller | 82/158 |
| 3,218,706 | A | * | 11/1965 | Zankl et al. | 483/9 |
| 3,602,077 | A | * | 8/1971 | Mitchell | 82/158 |
| 3,821,844 | A | * | 7/1974 | Harman et al. | 483/22 |
| 3,868,886 | A | * | 3/1975 | Bondie | 409/233 |
| 3,875,848 | A | * | 4/1975 | Powell | 409/233 |
| 4,141,133 | A | * | 2/1979 | Grinage | 483/9 |
| 4,156,962 | A | * | 6/1979 | Haller | 483/46 |
| 4,428,109 | A | * | 1/1984 | Seeger | 483/24 |

(Continued)

FOREIGN PATENT DOCUMENTS

DE    3913137 A1 * 11/1989
EP    132599 A1 * 2/1985

(Continued)

OTHER PUBLICATIONS

Taiwanese Office Action issued in TW 100115959 on Jul. 4, 2013.

(Continued)

*Primary Examiner* — Daniel Howell
*Assistant Examiner* — Nicole N Ramos
(74) *Attorney, Agent, or Firm* — DLA Piper LLP (US)

(57) ABSTRACT

There is provided an automatic tool changer which, in a precision roll turning lathe which feeds a tool post at a high speed, can automatically change a tool, such as a cutting tool, without stopping the machine, thereby enabling highly efficient ultra-Precision machining of a roll mold for molding of a large-sized plastic sheet. The automatic tool changer includes: a change device including a vertically movable pivot arm having a pivot axis and which pivots in a horizontal plane, a hand portion, mounted at the front end of the arm, for detachably gripping a tool holder, a pivot drive section for pivoting the pivot arm, and a lifting drive section for vertically moving the pivot arm; a tool holder stocker, having a plurality of circumferentially-arranged stages disposed at a predetermined distance from the pivot axis, each stage detachably holding a tool holder; a holder base, mounted to the tool post, for fixing and unfixing a tool holder through the rotation of a clamp shaft; and a clamp shaft operating device including an operating portion for clamping/unclamping the tool holder by rotating the clamp shaft.

14 Claims, 7 Drawing Sheets

(56) References Cited

U.S. PATENT DOCUMENTS

| | | | | |
|---|---|---|---|---|
| 4,499,800 A * | 2/1985 | Stahl | 82/158 |
| 4,515,049 A * | 5/1985 | Dietz et al. | 82/158 |
| 4,521,950 A * | 6/1985 | Kase et al. | 483/27 |
| 4,577,389 A * | 3/1986 | Shultz | 483/23 |
| 4,646,422 A * | 3/1987 | McMurtry | 483/1 |
| 4,742,609 A * | 5/1988 | Neumann | 483/3 |
| 4,922,591 A * | 5/1990 | Campbell | 483/1 |
| 4,945,628 A * | 8/1990 | Novak | 483/37 |
| 6,216,798 B1 * | 4/2001 | Riello et al. | 173/152 |
| 6,840,895 B2 * | 1/2005 | Perry et al. | 483/1 |
| 8,272,302 B2 | 9/2012 | Akiyama | |
| 2004/0026691 A1 * | 2/2004 | Hiramoto et al. | 257/40 |
| 2009/0120250 A1 | 5/2009 | Akiyama | |
| 2010/0197472 A1 * | 8/2010 | Strotzer et al. | 483/10 |

FOREIGN PATENT DOCUMENTS

| | | |
|---|---|---|
| JP | 06-238539 | 8/1994 |
| JP | 06-320375 | 11/1994 |
| JP | 2000-126953 | 5/2000 |
| JP | 2002-273602 | 8/2002 |
| JP | 2009-107066 | 5/2009 |
| JP | 2009-107067 | 5/2009 |
| TW | 200940221 | 10/2009 |

OTHER PUBLICATIONS

English Language Translation of Taiwanese Office Action issued in TW 100115959 on Jul. 4, 2013.
English Language Abstract of TW 200940221 published on Oct. 1, 2009.
English Language Abstract of JP 2009-107066 published May 21, 2009.
English Language Translation of JP 2009-107066 published May 21, 2009.
English Language Abstract of JP 2009-107067 published May 21, 2009.
English Language Translation of JP 2009-107067 published May 21, 2009.
English Language Abstract of JP 06-320375 published Nov. 22, 1994.
English Language Translation of JP 06-320375 published Nov. 22, 1994.
English Language Abstract of JP 2000-126953 published May 9, 2000.
English Language translation of JP 2000-126953 published May 9, 2000.
English Language Abstract of JP 2002-273602 published May 25, 2002.
English Language Translation of JP 2002-273602 published May 25, 2002.
Chinese Office Action issued in CN 201110132355.2 on May 6, 2013.
English Language Translation of Chinese Office Action issued in CN 201110132355.2 on May 6, 2013.
English Language Abstract of JP 06-238539 published Aug. 30, 1994.
English Language Translation of JP 06-238539 published Aug. 30, 1994.

* cited by examiner

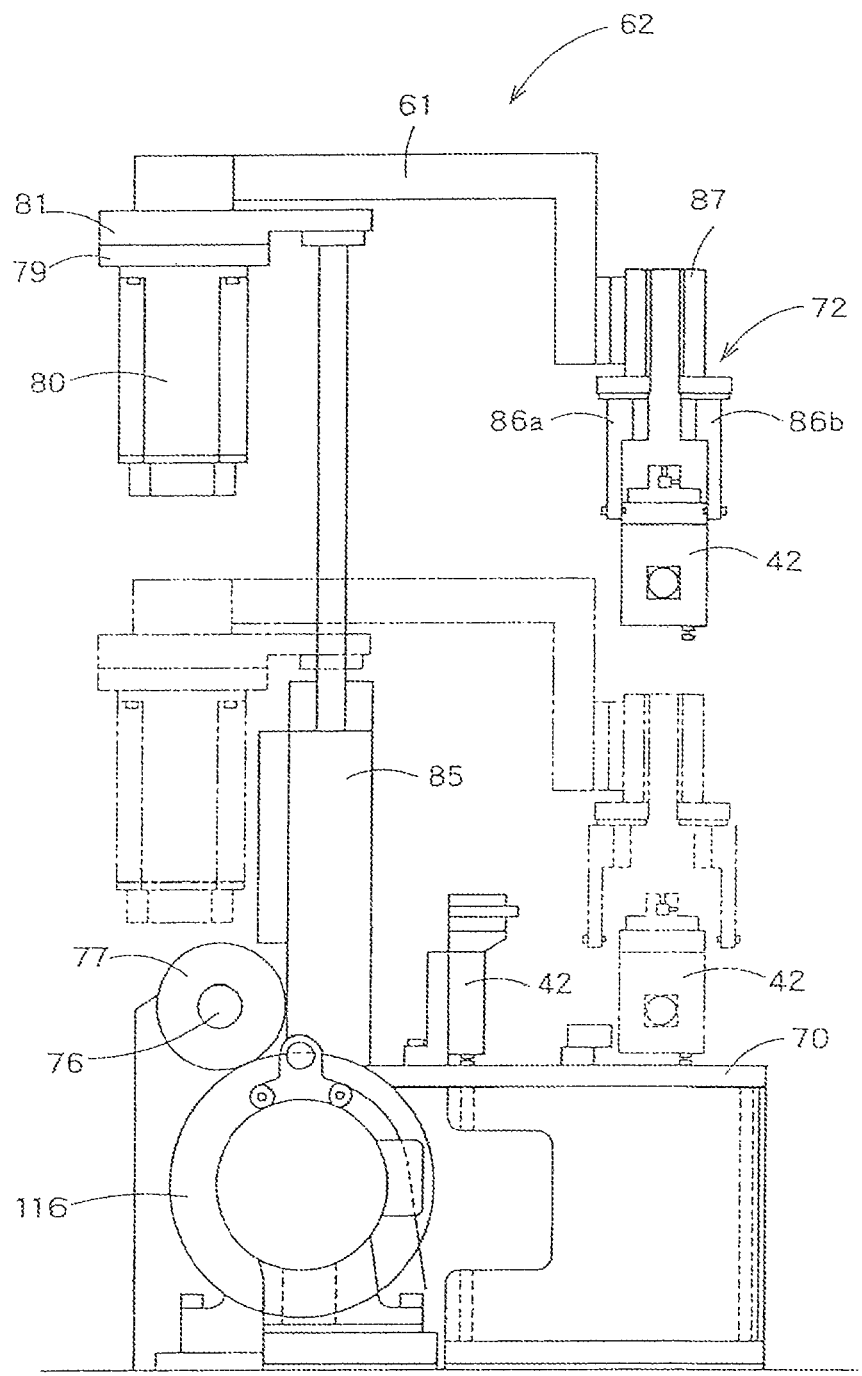
F I G. 6

PRECISION ROLL TURNING LATHE AND AUTOMATIC TOOL CHANGER THEREFOR

BACKGROUND OF THE INVENTION

1. Field of the Invention

The present invention relates to an automatic tool changer for a precision roll turning lathe, and more particularly to an automatic tool changer for use in a roll turning lathe for performing ultra-precision machining of a mold roll for molding of an optical film.

2. Description of the Background Art

A liquid crystal panel for use e.g. in a flat TV is incapable of self-emission of light and, therefore, a backlight unit is used as a light source to transmit light to the liquid crystal panel from behind. A plastic sheet having a fine pattern formed in the surface, such as a prism sheet or a diffusion sheet, is used as a requisite part in such a backlight unit. Such a plastic sheet can be molded by allowing a sheet, which has been extruded from an extruder, to pass between roll molds each having a machined pattern in the surface.

Recent advancement of ultra-precision machining by means of a roll turning lathe has realized ultra-precision machining of a roll mold for molding of a prism sheet or a diffusion sheet, for use in a liquid crystal panel.

Roll turning lathes for performing such ultra-precision machining have various problems to be solved, which have not been so serious for conventional roll turning lathes, in order to satisfactorily perform ultra-precision machining.

In ultra-precision machining of a roll, a pattern of numerous fine three-dimensional shapes of the order of a few tens of μm to a few hundred μm is to be machined, and it takes a long time to complete machining for one roll. For example, in the case of a long roll for a plastic sheet, it takes about one minute to machine one longitudinal groove in, the axial direction of the roll. Because of the fineness of each groove or three-dimensional shape to be machined in such a roll, a vast number of grooves or three-dimensional shapes must be machined in the entire roll. Assuming that 30 thousand longitudinal grooves must be machined in the entire roll, it should take 30000 minutes, i.e. 500 hours or 3 weeks, to machine all the grooves without interruption in the roll.

The applicant has proposed a precision roll turning lathe provided with a linear motor-driven air slider to move a tool post linearly at a high speed in the longitudinal direction of a roll (patent documents 1 and 2). The precision roll turning lathe can speed up feeding of a cutting tool and thereby considerably reduce the time it takes to machine a roll. The reduction in the machining time of such a precision roll turning lathe can be made on the premise of non-interruptive machining.

With the recent trend toward larger-sized, higher efficiency liquid crystal panels, there is a demand for molding of wider sheets, which requires machining of a larger-sized roll mold. Thus, it is not uncommon these days to machine a roll mold for a prism sheet, having a long roll length such as two meters.

A roll is generally coated with electroless-plated nickel and therefore has a hard surface. A need therefore exits for a long-life cutting tool. At present, machining of a roll having a large machining area cannot be completed by using only one cutting tool, and a change of cutting tool is needed in the course of machining. It is common practice in conventional precision roll turning lathes to manually change a cutting tool after stopping the machine.

On the other hand, a composite processing machine is known which comprises a lathe which also functions as a machining center and which is provided with an automatic tool changer (see patent documents 3 to 5).

PATENT DOCUMENTS

Patent document 1: Japanese Patent Laid-Open Publication No. 2009-107066
Patent document 2: Japanese Patent Laid-Open Publication No. 2009-107067
Patent document 3: Japanese Patent Laid-Open Publication No. H6-320375
Patent document 4: Japanese Patent Laid-Open Publication No. 2000-126953
Patent document 5: Japanese Patent Laid-Open Publication No. 2002-273602

SUMMARY OF THE INVENTION

When changing a tool such as a cutting tool manually, a heat-generating motor, etc. are stopped, and a cover that surrounds a machine is opened for a worker to enter and exit. A change will therefore be produced in the thermal environment around the machine. A slight thermal deformation of a structure such as a bed, caused by the change in the thermal environment, would adversely affect the accuracy of ultra-precision machining of a roll.

Further, the machine cools down before the tool change is completed, and a break-in operation is necessary to restore the machine to the original condition during machining. The break-in operation must be carried out for a long time.

It is conceivable to provide a precision roll turning lathe with an automatic tool changer so that a change of tool can be performed automatically without causing a change in the thermal environment.

The conventional automatic tool changer, installed in a lathe-related processing machine, performs a change of tool by means of a turret capable of indexing a plurality of tools, and is for use in a composite processing machine which is provided with a large-sized heavy turret and which is capable of not only roll machining but also various other types of processing.

On the other hand, in the case of a lathe exclusively for use in machining of a roll for molding of a plastic sheet, in particular a precision roll turning lathe as disclosed in the patent documents 1 and 2, which feeds a tool post at a high speed by means of a linear motor, the tool post should be made as light as possible for high-speed feeding. Therefore, it has not been possible to apply the conventional automatic tool changer for a composite processing machine. In a precision roll turning lathe for roll machining, therefore, it is common practice to perform a change of tool manually after stopping the machine. It takes a long time before restarting machining, leading to a significant lowering of the processing efficiency.

It is therefore an object of the present invention to solve the above problems in the prior art and provide an automatic tool changer for a roll turning lathe, which, in a precision roll turning lathe which feeds a tool post at a high speed, can automatically change a tool, such as a cutting tool, without stopping the machine, thereby enabling highly efficient ultra-precision machining of a roll mold for molding of a large-sized plastic sheet.

In order to achieve the object, the present invention provides an automatic tool changer to be installed in a precision roll turning lathe including a headstock and a tail stock, both mounted on a bed, for rotatably supporting a roll, and a tool post mounted on the bed, said automatic tool changer comprising: a change device including a vertically movable pivot arm having a pivot axis and which pivots in a horizontal plane, a hand portion, mounted at the front end of the arm, for detachably gripping a tool holder, a pivot drive section for pivoting the pivot arm, and a lifting drive section for vertically moving the pivot arm; a tool holder stocker having a plurality of circumferentially-arranged stages disposed at a predetermined distance from the pivot axis, each stage detachably holding a tool holder; a holder base, mounted to the tool post, for fixing and unfixing a tool holder through the rotation of a clamp shaft; and a clamp shaft operating device including an operating portion for clamping/unclamping the tool holder by rotating the clamp shaft.

The present invention also provides A precision roll turning lathe comprising a bed, a headstock, mounted on the bed, having a main spindle for rotating a roll as a workpiece while holding one end of the roll by means of a chuck, a tail stock, mounted on the bed and disposed opposite the headstock, for rotatably supporting the other end of the roll, a high-speed tool post mechanism including a rail receiver capable of adjusting its parallelism to the longitudinal direction of the roll, a guide rail supported by the rail receiver and having a hydrostatic guide, the tool post having a diamond cutting tool, which travels in an air-floating state on the guide rail, and a linear motor for driving the tool post, a change device including a vertically movable pivot arm having a pivot axis and which pivots in a horizontal plane, a hand portion, mounted at the front end of the arm, for detachably gripping a tool holder, a pivot drive section for pivoting the pivot arm, and a lifting drive section for vertically moving the pivot arm, a tool holder stocker having a plurality of circumferentially-arranged stages disposed at a predetermined distance from the pivot axis, each stage detachably holding a tool holder, a holder base, mounted to the tool post, for fixing and unfixing a tool holder through the rotation of a clamp shaft, and a clamp shaft operating device including an operating portion for clamping/ unclamping the tool holder by rotating the clamp shaft.

In a precision roll turning lathe which feeds a tool post at a high speed, the automatic tool changer of the present invention can automatically change a tool, such as a cutting tool, without stopping the machine, thereby enabling highly efficient ultra-precision machining of a roll mold for molding of a large-sized plastic sheet.

BRIEF DESCRIPTION OF THE DRAWINGS

FIG. 6 is a partially broken side view of a change device provided in the automatic tool changer according to the present invention;

DETAILED DESCRIPTION OF THE PREFERRED EMBODIMENTS

Preferred embodiments of the present invention will now be described with reference to the drawings.

Figure 1:
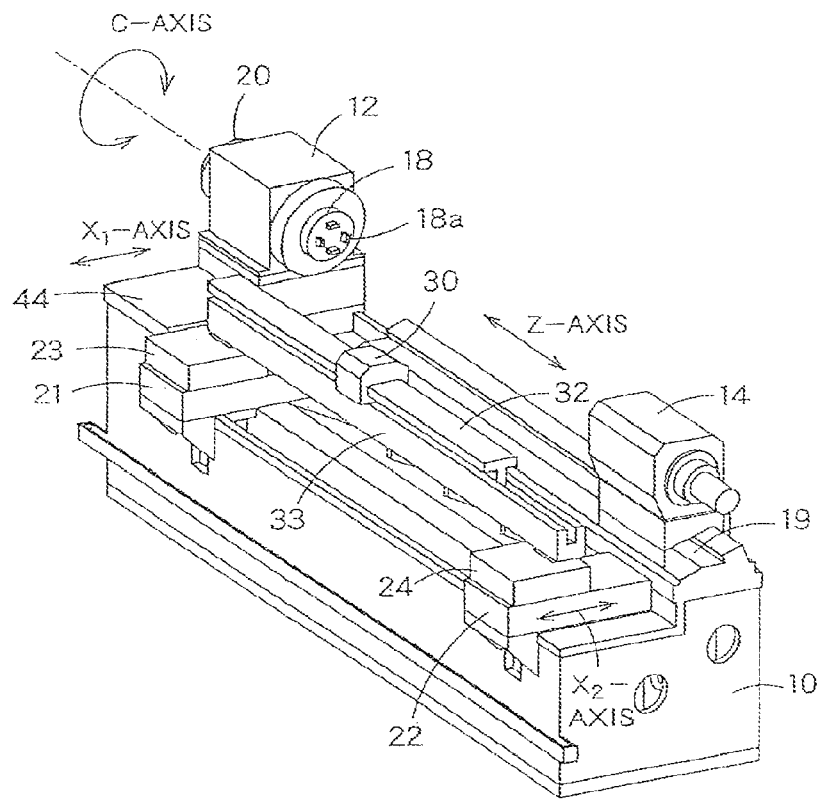
FIG. 1 is a perspective view of a precision roll turning lathe to which an automatic tool changer according to the present invention is applied.
Figure 2:
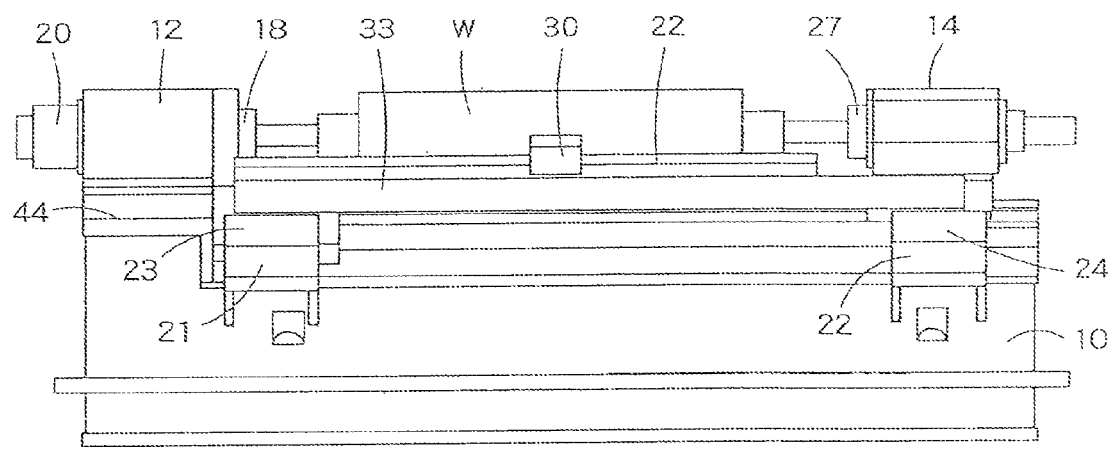
FIG. 2 is a front view of the precision roll turning lathe.

FIGS. 1 and 2 show an ultra-precision roll turning lathe to which an automatic tool changer according to the present invention is applied. In FIGS. 1 and 2, reference numeral 10 denotes a bed. On the bed 10 are mounted a headstock 12 and a tail stock 14. A roll W as a workpiece is rotatably supported by the headstock 12 and the tail stock 14.

The headstock 12 is disposed on one longitudinal end of the bed 10. The headstock 12 includes a main spindle 18, a chuck 18a secured to the front end of the main spindle 18, and a servo motor 20 for driving the main spindle 18. The main spindle 18 is supported by a not-shown hydrostatic bearing provided within the body of the headstock 12. The hydrostatic bearing may be a hydrostatic oil bearing or a hydrostatic air bearing. It is also possible to use a rolling bearing. The chuck 18a grips a spindle of the roll W with, four nails and transmits the rotation of the main spindle 18 to the roll W.

In the headstock 12, the servo motor 20 for driving the main spindle 18 is a built-in servo motor that directly drives the main spindle 18. The revolutions of the main spindle 18 are detected by an encoder. The detection signal of the encoder is fed back to perform position control and speed control of the main spindle 18. The headstock 12 thus can function as an indexing axis (C axis) to perform circumferential indexing of the roll W and can also function to continuously rotate the main spindle 18 at a constant rotating speed (up to several hundred revolutions per minute).

The tail stock 14 is disposed on the bed 10 and opposite the headstock 12. A guide surface 19 is provided in the upper surface of the bed 10, and the tail stock 14 is movable along the guide surface 19. As shown in FIG. 2, the tail stock 14 has a freely-rotatable main spindle 27 instead of a conventional common tail spindle, and ratatably supports a spindle of the roll W by means of a chuck mounted to the main spindle 27.

A first saddle 21 and a second saddle 22 are mounted on the bed 10 on both longitudinal sides. The first saddle 21 and the second saddle 22 are fixed on the bed 10 at positions spaced apart a predetermined distance. A first feed table 23 and a second feed table 24 are mounted on the first saddle 21 and the second saddle 22, respectively. A linear motor is used as a drive mechanism for feeding the first feed table 23 and the second feed table 24.

In the ultra-precision roll turning lathe, the X axis as a cut-in axis is comprised of an X1 axis for controlling the feed of the first feed table 23 and an X2 axis for controlling the feed of the second feed table 24. The X1 axis, and the X2 axis as cut-in axes are provided with an X1 axis servo mechanism and an X2 axis servo mechanism, respectively, so that positional control of each feed table can be performed independently. In addition to the X1 axis and the X2 axis, the lathe has the C axis for the headstock 12 and, as will be described in detail later, has the Z axis for feeing a tool post. An NC device performs numerical control of the above axes.

The ultra-precision roll turning, lathe is provided with a tool post 30 capable of moving at a high speed. The tool post 30 moves linearly at a high speed in the longitudinal direction of the roll W to machine grooves with high efficiency in the axial direction of the roll W. The tool post 30 is driven by a linear motor and can travel at a high speed in a floating state along a hydrostatic guide.

Referring to FIG. 1, a high-speed tool post mechanism includes the tool post 30, a guide rail 32 and a rail receiver 33. The rail receiver 33 is mounted on and extends between the first feed table 23 and the second feed table 24. In this embodiment both ends of the rail receiver 33 are respectively supported by means of the following pivots.

Figure 3:
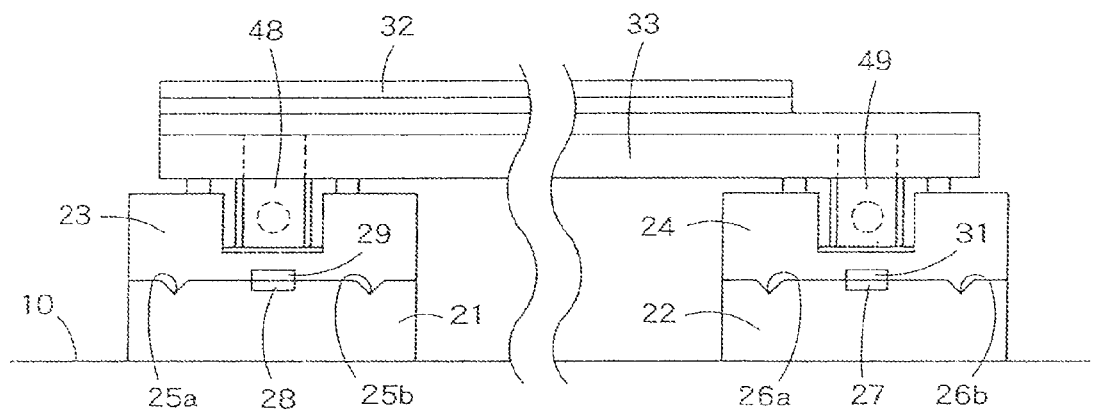
FIG. 3 is a front view of feed tables supporting a guide rail on which a tool post travels in the precision roll turning lathe.

As shown in FIG. 3, a first pivot 48 is mounted to the first feed table 23, and one end of the rail receiver 33 is supported on the table 23 via the first pivot 48. A second pivot 49 is mounted to the second feed, table 24, and the other end of the rail receiver 33 is supported on the table 24 via the second pivot 49.

Figure 4:
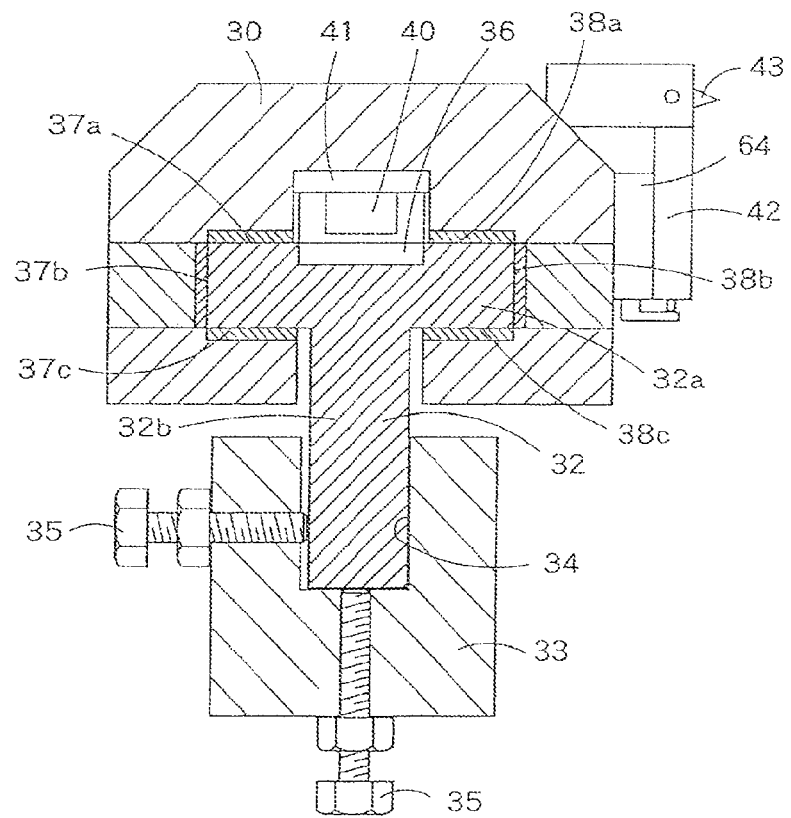
FIG. 4 is a cross-sectional view of the tool post of the precision roll turning lathe.

Referring to FIG. 4, a groove 34 into which the guide rail 32 is fitted is formed in the rail receiver 33 in the longitudinal direction. The guide rail 32 has a T-shaped cross section, with the horizontal portion 32a intersecting the vertical portion 32b at a right angle. The vertical portion 32b of the guide rail 32 is detachably fitted into the rail receiver 33 and is fixed by a fixing bolt 35. The fixing bolt 35 can also correct the straightness of the guide rail 32 by adjusting the degree of fastening. The guide rail 32 has a sufficient length to process rolls of various sizes. The horizontal portion 32a of the guide rail 32 is fit in and embraced by the tool post 30. Magnets 46, which constitute the stator of the linear motor, are arranged centrally in the upper surface of the horizontal portion 32a of the guide rail 32 in the longitudinal direction of the rail.

Sliding surfaces 37a, 37b, 37c for the tool post 30 are formed in the upper, lower and side surfaces of the horizontal portion 32a of the guide rail 32. The tool post 30 is provided with hydrostatic air bearings 38a, 38b, 38c. Air is ejected from the hydrostatic air bearings 38a, 38b, 38c toward the sliding surfaces 37a, 37b, 37c, whereby a bearing gap is formed between the sliding surfaces 37a, 37b, 37c and the hydrostatic air bearings 38a, 38b, 38c.

A coil 40, constituting the mover of the linear motor, is carried on a cooling block 41 and disposed under the tool post 30 such that it, faces the magnets 36. Cooling water is supplied to the cooling block 41 to prevent overheat of the coil 40. The linear motor constitutes a Z-axis drive mechanism for moving the tool post (air slider) 30 and controlling the position and the speed of the tool post 30.

A tool holder 42 is mounted via a holder base 64 to the tool post 30, and a cutting tool 43 is secured to the tool holder 42. A diamond tip for ultra-precision machining is held at the front end of the cutting tool 43.

<Overall Construction of Automatic Tool Changer>

The overall construction of an automatic tool changer according to the present invention, which is used in the thus-constructed ultra-precision roll turning lathe, will now be described with reference to FIG. 5. The automatic tool changer is to be installed on the automatic tool changer installation table 44 shown in FIG. 1.

The automatic tool changer of this embodiment is mainly comprised of a holder stocker 60 for stocking a plurality of tool holders 42 in a line, a change device 62 including a pivot arm 61 which pivots between the holder stocker 60 and the tool post 30, a holder base 64 mounted to the tool post 30, and a clamp shaft operating device 66 for performing the operation of clamping or unclamping a tool holder 42 attached to the holder base 64.

Figure 5:
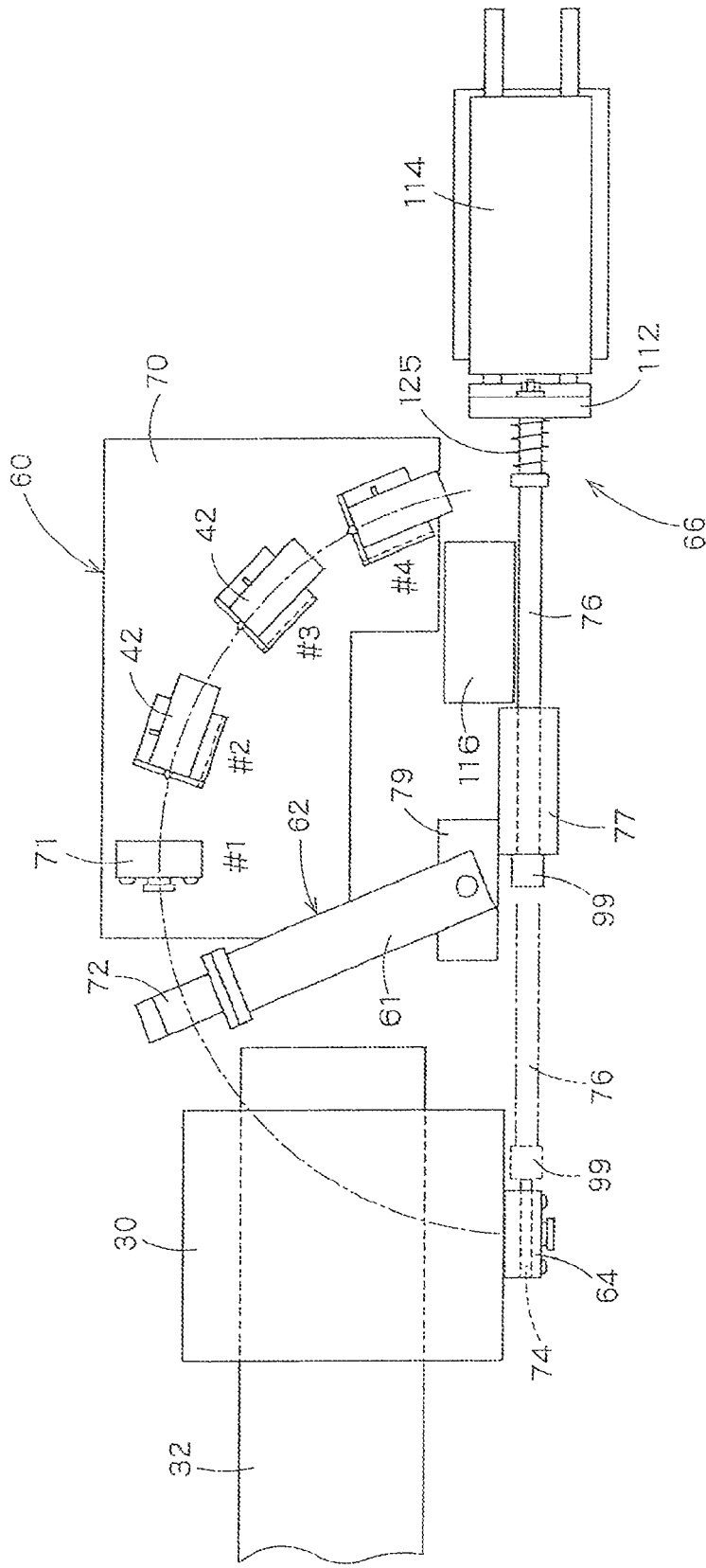
FIG. 5 is a plan view showing the layout of the parts of an automatic tool changer according to the present invention.

Referring to FIG. 5, the holder stocker 60 includes a stocker pedestal 70, and a plurality of stages 71 for holding the tool holders 42 are disposed on the upper surface of the stocker pedestal 70 at regular intervals on a circle. The tool holders 42 with a cutting tool secured thereto are detachably set on the stages 71 (the tool holders 42 will be hereinafter distinguished by numbering as #1, #2 . . . , as necessary). The pivot arm 61 of the change device 62 has at the front end a hand portion 72 for gripping a tool holder 42. The pivot arm 61 can grip a tool holder 42 with the hand portion 72 and transport the tool holder 42 between the holder, stocker 60 and the holder base 64 on the tool post 30. The movement of the pivot arm 61 is a combination of a pivot movement and a vertical movement. As shown in FIG. 5, the stages 71 are circumferentially arranged on the stocker pedestal 70 at regular intervals on a circle having the same radius as the pivot radius of the pivot arm 61. In the holder stocker 60 of this embodiment, the tool holders 42 are thus arranged on the circle on the stocker pedestal 70. Instead of the stocker pedestal 70, it is possible to use a disk capable of indexing rotational positions, and install tool holders 42 on the disk. It is also possible to design the stocker pedestal 70 to be capable, of moving the stages 71 by chain drive.

The holder base 64 mounted on the tool post 30 has a built-in clamping mechanism capable of fixing and unfixing a tool holder 42.

The clamp shaft operating device 66 includes a rotating wrench shaft 76 as an operating portion, for operating the holder base 64, and moves the rotating wrench shaft 76 from the standby position shown in FIG. 5 toward the tool post 30 and operates the holder base 64 with the rotating wrench shaft 76 to clamp/unclamp the tool holder 42.

The component devices of the automatic tool changer will now be described in greater detail.

<Change Device>

FIG. 6 shows the construction of the change device 62. Referring to FIG. 6, a lifting cylinder 85 as a drive mechanism for moving up and down the pivot arm 61 is installed in a vertical position in the change device 62. A motor base 79 is coupled to the front end of the piston rod of the lifting cylinder 85. A servo motor 80 for pivoting the pivot arm 61 is secured to the lower surface of the motor base 79. The base end of the pivot arm 61 is coupled via a joint member 81 to the rotating shaft of the servo motor 80. The pivot arm 61 is thus driven directly by the servo motor 80 and can pivot in a horizontal plane.

As shown in FIG. 6, the hand portion 72, provided at the front end of the pivot arm 61, has a pair of openable/closable nails 86a, 86b so that the hand portion 72 can grip a tool holder 42 by closing the nails 86a, 86b with an actuator 87 and can release the tool holder 42 by opening the nails 86a, 86b.

<Holder Base>

Figure 7:
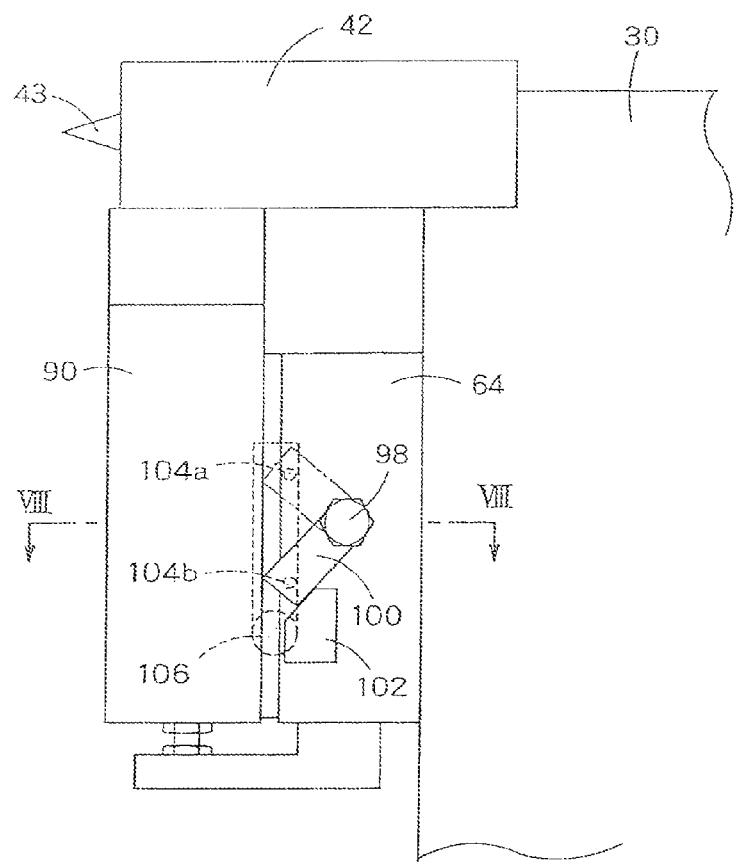
FIG. 7 is a side view of a holder base and a tool holder for use in the automatic tool changer according to the present invention.
Figure 8:
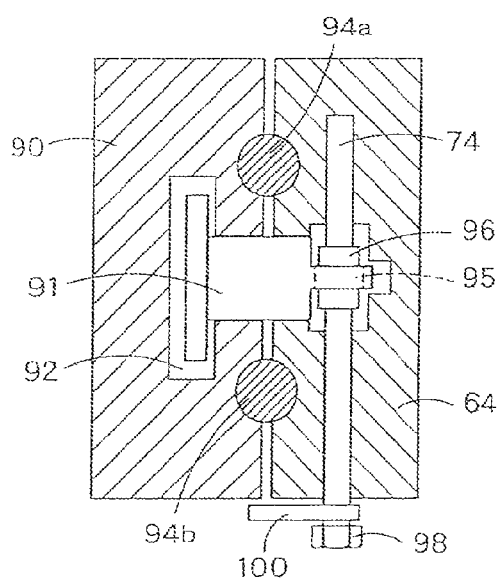
FIG. 8 is a cross-sectional view taken along the line VIII-VIII of FIG. 7.

FIG. 7 shows, a tool holder 42 fixed on the holder base 64 of the tool post 30, and FIG. 8 shows a cross-sectional view taken along the line of FIG. 7.

The holder base 64 includes a clamp shaft 74 and a T-shaped clamp member 91 as main components. The tool holder 42 holding a cutting tool 43 is formed integrally with a block 90, and is attach to and detached from the holder base 64 via the block 90.

A T-shaped groove 92 is formed in the back portion of the block 90 of the tool holder 42. The T-shaped clamp member 91, having, a T-shaped cross section, is movably fitted into the T-shaped groove 92. Vertically-extending arc-shaped grooves, facing each other, are formed in the opposing surfaces of the holder base 64 and the block 90, and cylindrical positioning reference pieces 94a, 94b are fixed in the grooves of the holder base 64.

Figure 9:
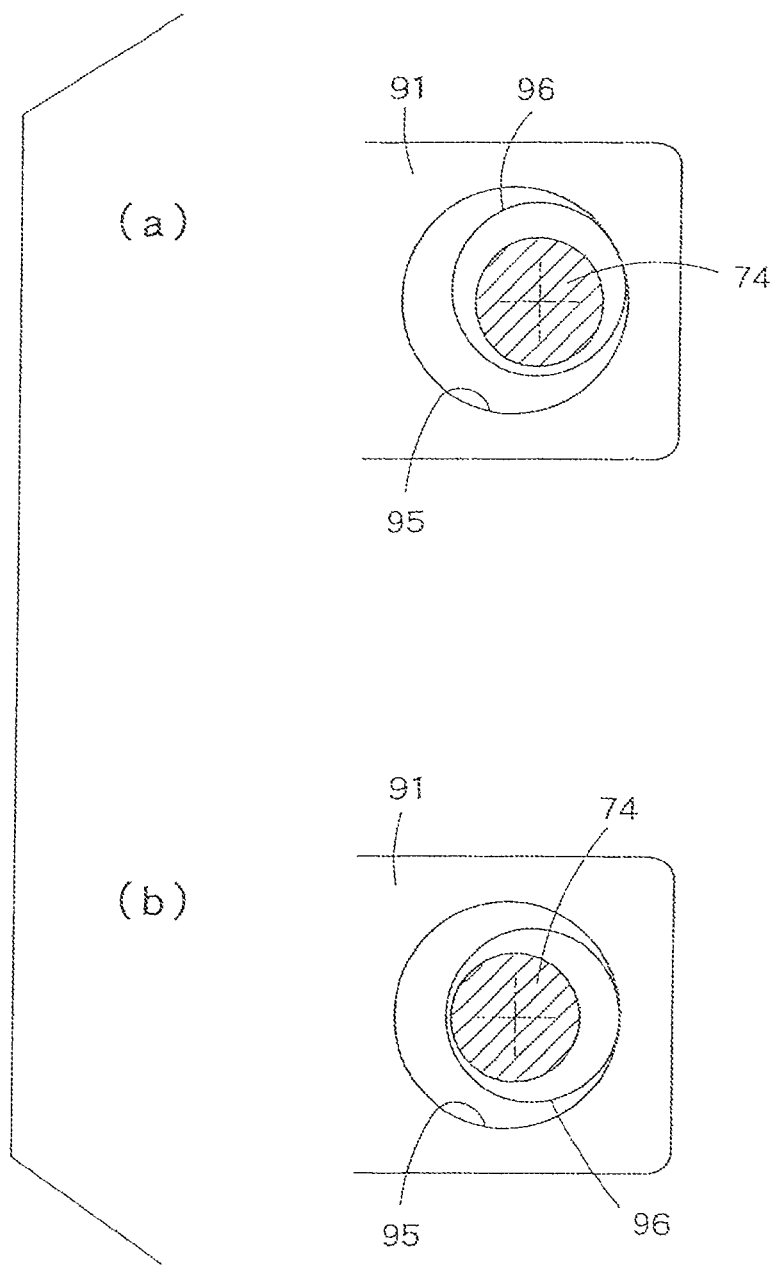
FIGS. 9(a) and 9(b) are diagrams illustrating the operation of an eccentric cam mechanism provided within the holder base of the automatic tool changer according to the present invention.

As shown in FIG. 8, the T-shaped clamp member 91 is coupled to the clamp shaft 74 by the following eccentric cam mechanism:

A circular hole 95 is formed in the tail portion of the T-shaped clamp member 91. The clamp shaft 74 is rotatably inserted through the circular hole 95 of the T-shaped clamp member 91 such that it extends in the width direction of the holder base 64. An eccentric cylindrical cam 96 is provided integrally with the clamp shaft 74, and the eccentric cylindrical cam 96 slides on the peripheral surface of the circular hole 95. The tool holder 42 is in an unclamped state when the eccentric cylindrical cam 96 is in the position shown in FIG. 9(a). As the clamp shaft 74 rotates and the eccentric cylindrical cam 96 moves to the position shown in FIG. 9(b), the T-shaped clamp member 91 is drawn in and the tool holder 42 is firmly clamped to the holder base 64.

As shown in FIG. 8, to rotate the clamp shaft 74, a bolt head 98, e.g. a hexagonal head, is provided at the front end of the clamp shaft 74. The head 98 engages a socket 99 mounted at the front end of the rotating wrench shaft 76 of the clamp shaft operating device 66 (see FIG. 10).

Referring to FIG. 7, a detection piece 100 is attached to the clamp shaft 74 at a position adjacent to the head 98 in order to detect a clamping position and an unclamping position. Reference numeral 102 denotes a stopper fixed on the side surface of the holder base 64. When the clamp shaft 74 is rotated clockwise and the detection piece 100 comes to the position shown by the dashed-double dotted line in FIG. 7, the tool holder 42 switches to the clamped state as shown in FIG. 9(b). When the clamp shaft 74 is rotated counterclockwise in FIG. 7, the detection piece 100 comes into contact with the stopper 102 and the rotation stops. At that position of the detection piece 100, the tool holder 42 is in the unclamped state as shown in FIG. 9(a). Of clamping/unclamping detection sensors 104a, 104b, comprised of proximity switches, the unclamping detection sensor 104b then urns on. The unclamping of the tool holder 42 can thus be detected. The clamping/unclamping detection sensors 104 are mounted at the front end of the below-described detection rod 106 of the clamp shaft operating device 66.

<Clamp Shaft Operating Device>

The clamp shaft operating device 66 will now be described in detail with reference to FIG. 10.

Figure 10:
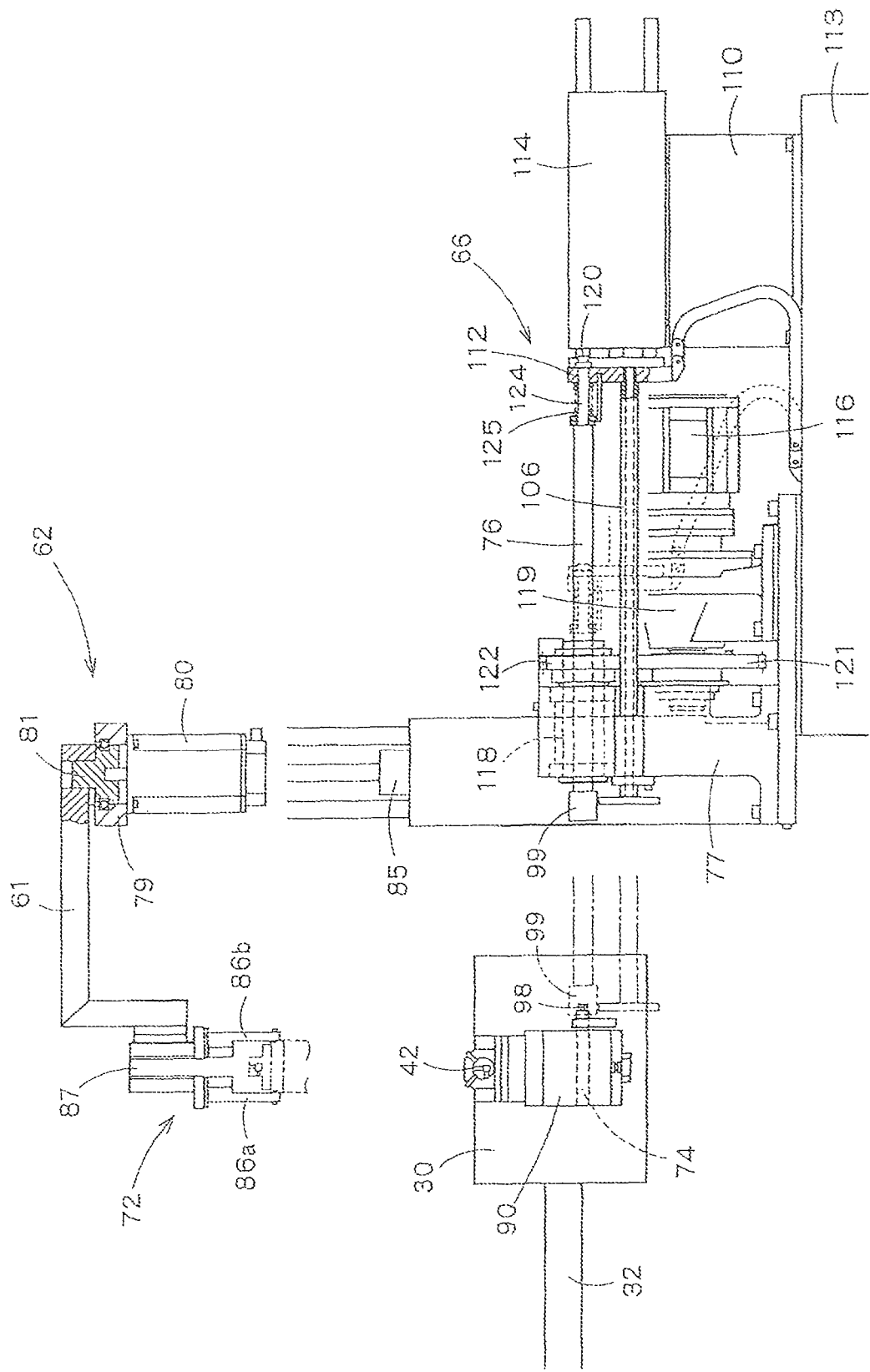
FIG. 10 is a cross-sectional view showing the construction of a clamp shaft operating device provided in the automatic tool changer according to the present invention.

Referring to FIG. 10, a cylinder 114 for moving the rotating wrench shaft 76 forward and backward in the axial direction is installed on a cylinder base 110. The piston rod of the cylinder 114 is coupled to a mobile plate 112.

A wrench rotating motor 116 for rotationally driving the rotating wrench shaft 76 is installed on a machine base 113. In this embodiment a ball spline shaft is used as the rotating wrench shaft 76. The rotating wrench shaft 76 penetrates through a support portion 77 and extends forward. The support portion 77 incorporates a rotating bush 118 that engages the ball spline shaft constituting the rotating wrench shaft 76. The rotating bush 118 is rotatably supported in the support portion 77. The rotting wrench shaft 76 is spline-engaged with the rotating bush 118, and can therefore slide in the axial direction through the rotating bush 118 and rotate with the rotation of the rotating bush 118. The wrench rotating motor 116 is coupled via a reducer 119 to a gear 121, and the rotating bush 118 is coupled to a gear 122. The gears 121, 122 are engaged with each other and constitute a gear mechanism for transmitting the rotary torque of the wrench rotating motor 116 to the rotating bush 118. The socket 99 is mounted at the front end of the rotating wrench shaft 76 and, as described above, the socket 99 detachably engages the head 98 of the clamp shaft 74, so that the rotary torque can be transmitted from the rotating wrench shaft 76 to the clamp shaft 74.

On the other hand, a joint portion 124 which, unlike the spline portion, has a smooth surface is formed at the rear end of the rotating wrench shaft 76. The joint portion 124 slidably and rotatably penetrates through the mobile plate 112, and a retaining nut 120 is fastened to the terminal end of the joint portion 124. A spring 125 is mounted on the joint portion 124 with the mobile plate 112 as a spring receiver, and the rotating wrench shaft 76 is biased forward by the elastic force of the spring 125.

A detection rod 106 for detecting the clamping/unclamping of the tool post 42 is supported by the mobile plate 112 and extends parallel to the rotating wrench shaft 76. At the front end of the detection rod 106 are mounted the sensor 104a for detecting the clamping of the tool holder 42 and the sensor 104b for detecting the unclamping of the tool holder 42 (see FIG. 7).

The operation and effects of the thus-constructed automatic tool changer of this embodiment will now be described.

The following description illustrates, as exemplary ultra-precision machining with the roll turning lathe, machining of fine longitudinal (axial) grooves in the entire surface of a roll W. Referring to FIGS. 1 and 2, the tool post 30 is moved at a high speed to machine fine grooves one by one in the surface of the roll W. After machining of one groove is completed, the machining position on the roll W for the next groove is indexed by c-axis control of the main spindle 18. Thereafter, the tool post 30 is moved at a high speed to machine the next groove on the roll W. The above operation is repeated to machine grooves in the entire surface of the roll W.

When fine grooves are to be machined in a one-by-one manner in the entire surface of the roll W, a vast number of grooves must be machined in the large processing area.

To perform such machining with high efficiency, the roll turning lathe of this embodiment is designed to move the tool post 30 at a high speed, as follows.

As described above, the tool post 30 is comprised of an air slider which is driven by the linear motor and can travel at a high speed along the hydrostatic bearings of the guide rail 32. The roll turning lathe can feed a cutting tool at a significantly higher speed than a conventional roll turning lathe which feeds a carriage on which a tool post is mounted.

The cutting edge of a cutting tool will wear and the tool holder 42 on the tool post 30 may need to be changed after long-term roll machining with the high-speed tool post 30.

The automatic tool changer of this embodiment performs a change of the tool holder 42 in the following manner. An outline of the sequence of tool change operation will be first described with reference to FIGS. 5 and 6.

First, the tool post 30 is moved to the end of the guide rail 32 and positioned at a predetermined tool change position. Next, the clamp shaft operating device 66 moves, forward and unclamps the tool holder 42 from the holder base 64 of the tool post 30. Thereafter, the clamp shaft operating device 66 stands by at the forward position while keeping the rotating wrench shaft 76 connected to the clamp shaft 74.

On the other hand, in the change device 62 which has been standing by, the pivot arm 61 pivots towards the tool post 30 and stops at a position right above the tool holder 42 on the holder base 64. The pivot arm 61 then descends and grips the tool holder 42 with the hand portion 72. The pivot arm 61 then rises and detaches the tool holder 42 from the holder base 64, and pivots to move the tool holder 42 to a position right above an empty stage 71 on the holder stocker 60. The pivot arm 61 then descends to set the tool holder 42 on the empty stage 71.

Next, the pivot arm 61 pivots to a position right above a tool holder 42 to be used next, and then descends and grips the tool holder 42 with the hand portion 72. Thereafter, the pivot arm 61 rises, pivots and then descends while holding the tool holder 42, and attaches the tool holder 42 to the holder base 64 of the tool post 30. Thereafter, the pivot arm 61 rises and pivots to return to the standby position.

Thereafter, the rotating wrench shaft 76 rotates the clamp shaft 74 to fix the tool holder 42 to the holder base 64. After the clamping of the tool holder 42, the clamp shaft operating device 66 moves backward to the standby position. The sequence of tool change operation is thus completed.

In the sequence of automatic tool change operation, it is especially important to safely and securely clamp/unclamp a tool holder 42 to or from the holder base 64. The clamping/unclamping operation of the clamp shaft operating device 66 will now be described in detail with reference to FIGS. 7 through 10.

<Unclamping Operation>

Referring to FIG. 10, the clamp shaft operating device 66 moves forward and the rotating wrench shaft 76 comes into connection with the clamp shaft 74. The spring 125 is compressed upon contact of the socket 99 of the rotating wrench shaft 76 with the head 98 of the clamp shaft 74. The cushioning effect of the spring 125 can prevent an excessive pressure from being applied to the clamp shaft 74.

When there is a phase mismatch between the socket 99 and the head 98 of the clamp shaft 74, the socket 99 is pressed against the head 98 of the clamp shaft 74 by the elastic force of the spring 125. By rotating the rotating wrench shaft 76 very slowly, the socket 99 engages the head 98 when their phases match. The clamp shaft 74 and the rotating wrench shaft 76 can thus be connected securely and safely.

Referring to FIGS. 7 and 8, when the clamp shaft 74 is rotated clockwise with the rotating wrench shaft 76, the eccentric cylindrical cam 96 moves to the position shown in FIG. 9(a), whereby the T-shaped clamp member 91 is released from the restraint of the eccentric cylindrical cam 96. As a result, the block 90 of the tool holder 42 is unclamped and the tool holder 42 becomes removable from the holder base 64 together with the block 90.

Upon the unclamping, the detection piece 100 of the clamp shaft 74 hits against the stopper 102, and the clamp shaft 74 does not rotate any more and, at the same time, a torque limiter operates to prevent application of an excessive torque to the clamp shaft 74. This can securely prevent the clamp shaft 74 from being over-rotated and re-clamping the toot holder 42 with the T-shaped clamp member 91.

Further, upon the unclamping, the detection piece 100 faces the unclamping detection sensor 104b mounted at the front end of the detection rod 106 and the unclamping detection sensor 104b therefore turns on. The unclamping of the tool holder 42 can thus be electrically detected.

<Clamping Operation>

When the clamp shaft 74 is rotated counterclockwise with the rotating wrench shaft 76, the eccentric cylindrical cam 96 moves to the position shown in FIG. 9(b), and the T-shaped clamp member 91 is drawn into the clamping position. As a result, the block 90 of the tool holder 42 is strongly clamped by the T-shaped, clamp member 91 and the tool holder 42 is firmly fixed to the holder base 64. Upon the clamping, the detection piece 100 faces the clamping detection sensor 104a mounted at the front end of the detection rod 106 and the clamping detection sensor 104a therefore turns on. The clamping of the tool holder 42 can thus; be electrically detected.

When, the tool holder 42 is clamped and the torque rises to a predetermined value, a not-shown torque limiter operates to stop the wrench rotating motor 116.

As described above, the automatic tool changer of this embodiment can change the tool holder 42 of the tool post 30 safely and securely. By providing a plurality of tool holders 42 having cutting tools of the same type, machining of a roll can be efficiently carried out while performing a tool change as necessary, without stopping the machine from the start to the end of machining, even when the roll is a long one having a large machining area.

The automatic tool exchanger can eliminate the need to stop the operation of a roll turning lathe for a tool change operation, and to open a cover that surrounds the machine for a worker to enter and exit the cover. This makes it possible to perform a tool change without producing a change in the environmental temperature. Furthermore, unlike the conventional manual tool change, there is no need of break-in operation of a roll turning lathe after a tool change. Thus, machining can be restarted immediately after a tool change, enabling high-efficiency machining making full use of the high-speed traveling performance of an air slider-type tool post.

Though the above description has been made with reference to the case where a tool change is performed in the course of the same machining step, and therefore the same type of cutting tools are attached to the tool holders 42 provided in the holder stocker 60 shown in FIG. 5, it is possible to attach various types of cutting tools to the tool holders 42. For example, a round cutting tool for rough machining may be attached to the #1 tool holder 42, V-shaped cutting tools for machining of V-shaped grooves may be attached, to the #2, #3 tool holders 42, and a cutting tool for finish machining may be attached to the #4 tool holder 42.

Further, it is possible to attach to the #2 tool holder 42 a V-shaped cutting tool such that its cutting edge is oriented in the axial direction of a roll in order to machine axial grooves, and to attach to the #3 tool holder 42 a V-shaped cutting tool, such that its cutting edge is oriented in the circumferential direction of the roll in order to machine circumferential grooves.

By providing different types of cutting tools in the cutting tools 42 according to different roll machining steps, it becomes possible to automatically proceed with various types of roll, machining without stopping the machine while performing a tool change upon switching between machining steps.

The automatic tool changer of this embodiment also has the following mechanistic advantages:

According to this embodiment, the tool post 30 is configured to attach only one tool holder 42 thereto, and the holder base 64 is merely provided with the simple clamping mechanism, while the clamp shaft operating device 66 is separately provided to perform the clamping and unclamping operations from the outside of the tool post 30.

Because the clamping/unclamping mechanism, which is essential for a tool change operation, is provided outside the tool post 30, it is only necessary to provide the tool post 30 with the holder base 64 having the minimum necessary construction. This can minimize the increase in the weight of the tool post 30 and thus can prevent a significant lowering of the inherent high-speed performance of the high-speed tool post. It thus becomes possible to perform an automatic tool change operation while carrying out high-efficiency machining by making full use of the high-speed performance of the tool post, achieving a synergistic effect on enhancement of machining efficiency.

While the present invention has been described with reference to preferred embodiments, it is understood that the present invention is not limited to the embodiments described above, but is capable of various changes and modifications within the scope of the inventive concept as expressed herein. For example, the automatic tool exchanger of the present invention can be applied not only to a precision roll turning lathe provided with a high-speed tool post, but also to a common roll turning lathe which feeds a carriage on which a tool post is mounted.

What is claimed is:

1. An automatic tool changer configured to be installed in a precision roll turning lathe including a headstock and a tail stock, both mounted on a bed, for rotatably supporting a roll, and a tool post movably mounted for movement parallel to the roll on the bed, said automatic tool changer comprising:
    a change device including:
        a vertically movable pivot arm having a pivot axis and which pivots in a horizontal plane,
        a hand portion, mounted at the front end of the arm, configured for detachably gripping a tool holder,
        a pivot drive section configured for pivoting the pivot arm, and
        a lifting drive section configured for vertically moving the pivot arm;
    a tool holder stocker comprising a plurality of circumferentially-arranged stages disposed at a predetermined distance from the pivot axis, each stage detachably holding a tool holder;
    a holder base, mounted to the tool post, configured for detachably holding the tool holder to the holder base; and
    a clamp shaft operating device including:
        a clamp shaft detachably connected to the holder base; and
        an operating portion configured for connecting/disconnecting the clamp shaft to the holder base and clamping/unclamping the tool holder by rotating the clamp shaft from an outside of the holder base;
    wherein the holder base includes a cam mechanism configured for converting the rotation of the clamp shaft into clamping motions that fix the tool holder to the holder base and unfix the tool holder from the holder base.

2. The automatic tool changer according to claim 1, wherein the holder base includes a positioning reference piece configured for positioning the tool holder at a predetermined position, a T-shaped clamp member movably fitted into a T-shaped groove formed in the back surface of the tool holder, and an eccentric cam mechanism configured for coupling the clamp member and the clamp shaft and configured for converting the rotation of the clamp shaft into a clamping operation of drawing in and restraining the clamp member or an unclamping operation of releasing the clamp member from the restraint.

3. The automatic tool changer according to claim 1, wherein the operating portion of the clamp shaft operating device includes a rotating wrench shaft including a ball spline shaft and a socket which detachably engages the head of the clamp shaft, a wrench shaft rotating mechanism configured for rotating the rotating wrench shaft, a linear movement mechanism configured for moving the rotating wrench shaft forward and backward in the axial direction, and a rotating bush with which the ball spline shaft engages movably in the axial direction and to which a rotary torque is transmitted from the wrench shaft rotating mechanism.

4. The automatic tool changer according to claim 3, wherein the linear movement mechanism of the clamp shaft operating device includes a cylinder as a drive source; a mobile plate that supports the rotating wrench shaft, the mobile plate being coupled to the front end of the piston rod of the cylinder; wherein the rear end of the rotating wrench shaft penetrates through the mobile plate movably in the axial direction; and a spring which biases the rotating wrench shaft forward, the spring being mounted on a rear end portion of the rotating wrench shaft, wherein the mobile plate receives the spring.

5. The automatic tool changer according to claim 3, wherein the clamp shaft operating device further includes a clamping/unclamping detector configured for detecting clamping/unclamping of the tool holder by detecting the rotational position of the clamp shaft.

6. The automatic tool changer according to claim 3, wherein the wrench shaft rotating mechanism of the clamp shaft operating device includes a torque limiter configured for preventing a torque exceeding a predetermined value from being applied to the rotating wrench shaft.

7. The automatic tool changer according to claim 1, wherein the tool holders, stocked in the tool holder stocker, include different types of cutting tools attached thereto.

8. A precision roll turning lathe comprising:
    a bed;
    a headstock, mounted on the bed, including:
        a main spindle configured for rotating a roll as a workpiece while holding one end of the roll by means of a chuck; and
        a tail stock, mounted on the bed and disposed opposite the headstock, the tail stock configured for rotatably supporting the other end of the roll;
    a high-speed tool post mechanism including:
        a rail receiver capable of adjusting its parallelism to a longitudinal direction of the roll;
        a guide rail supported by the rail receiver and including a hydrostatic guide; a diamond cutting tool, which travels in an air-floating state on the guide rail; and
        a linear motor configured for driving the tool post;
    a change device including:
        a vertically movable pivot arm including a pivot axis and which pivots in a horizontal plane;
        a hand portion, mounted at the front end of the arm, configured for detachably gripping a tool holder;
        a pivot drive section configured for pivoting the pivot arm; and
        a lifting drive section configured for vertically moving the pivot arm;
    a tool holder stocker including a plurality of circumferentially-arranged stages disposed at a predetermined distance from a pivot axis of the pivot arm, each stage detachably holding a tool holder;
    a holder base, mounted to the tool post, configured for fixing and unfixing a tool holder through the rotation of a clamp shaft; and
    a clamp shaft operating device including an operating portion configured for clamping/unclamping the tool holder by rotating the clamp shaft.

9. The precision roll turning lathe according to claim 8, wherein the holder base includes a positioning reference piece for positioning the tool holder at a predetermined position, a T-shaped clamp member movably fitted into a T-shaped groove formed in the back surface of the tool holder, and an eccentric cam mechanism configured for coupling the clamp member and the clamp shaft and converting the rotation of the clamp shaft into a clamping operation of drawing in and restraining the clamp member or an unclamping operation of releasing the clamp member from the restraint.

10. The precision roll turning lathe according to claim 8, the operating portion of the clamp shaft operating device includes a rotating wrench shaft including a ball spline shaft and a socket which detachably engages the head of the clamp shaft, a wrench shaft rotating mechanism configured for rotating the rotating wrench shaft, a linear movement mechanism configured for moving the rotating wrench shaft forward and backward in the axial direction, and a rotating bush with which the ball spline shaft engages movably in the axial direction and to which a rotary torque is transmitted from the wrench shaft rotating mechanism.

11. The precision roll turning lathe according to claim 10, wherein the linear movement mechanism of the clamp shaft operating device includes a cylinder as a drive source; a mobile plate that supports the rotating wrench shaft, the mobile plate being coupled to the front end of the piston rod of the cylinder; wherein the rear end of the rotating wrench shaft penetrates through the mobile plate movably in the axial direction; and a spring which biases the rotating wrench shaft forward, the spring being mounted on a rear end portion of the rotating wrench shaft, wherein the mobile plate receives the spring.

12. The precision roll turning lathe according to claim 10, wherein the clamp shaft operating device further includes a clamping/unclamping detector configured for detecting clamping/unclamping of the tool holder by detecting the rotational position of the clamp shaft.

13. The precision roll turning lathe according, to claim 10, wherein the wrench shaft rotating mechanism of the clamp shaft operating device includes a torque limiter configured for preventing a torque exceeding a predetermined value from being applied to the rotating wrench shaft.

14. The precision roll turning lathe according to claim 8, wherein the tool holders, stocked in the tool holder stocker, include different types of cutting tools attached thereto.

* * * * *